United States Patent [19]

Hannam et al.

[11] Patent Number: 5,160,885

[45] Date of Patent: Nov. 3, 1992

[54] METAL DETECTING APPARATUS AND APPARATUS INCLUDING GUIDE HOUSING FOR GUIDING A METAL TEST PIECE, FOR TESTING METAL DETECTING APPARATUS

[75] Inventors: Clifford Hannam, Pulborough; Gerald A. Harwood, Thetford, both of England

[73] Assignee: Hitech Metal Detectors Limited, Shoreham-by-Sea, England

[21] Appl. No.: 581,554

[22] Filed: Sep. 12, 1990

[30] Foreign Application Priority Data

Sep. 15, 1989 [GB] United Kingdom ............ 8920957

[51] Int. Cl.[5] .................. G01R 35/00; G01R 33/12; G01N 27/72
[52] U.S. Cl. ........................... 324/202; 73/1 R; 209/567; 324/234
[58] Field of Search ............ 324/202, 226, 228, 234, 324/236–243; 361/180; 209/567; 340/551; 73/1 R

[56] References Cited

U.S. PATENT DOCUMENTS

| | | | |
|---|---|---|---|
| 4,271,763 | 6/1981 | Berger | 324/228 X |
| 4,488,116 | 12/1984 | Plesko | 324/236 |
| 4,578,643 | 3/1986 | Junker et al. | 324/202 |
| 4,600,882 | 7/1986 | Cottrell, Jr. | 324/202 X |
| 4,641,091 | 2/1987 | Cone | 324/202 |
| 4,672,837 | 6/1987 | Cottrell, Jr. | 324/202 |
| 4,683,430 | 7/1987 | Harris et al. | 324/240 X |
| 4,814,734 | 3/1989 | Moran | 324/239 X |

FOREIGN PATENT DOCUMENTS

| | | |
|---|---|---|
| 562089 | 5/1987 | Australia . |
| 2020812 | 11/1979 | United Kingdom . |
| 1570640 | 7/1980 | United Kingdom . |

Primary Examiner—Gerard R. Strecker
Attorney, Agent, or Firm—Beveridge, DeGrandi & Weilacher

[57] ABSTRACT

Apparatus for testing metal detecting apparatus employs a test piece of representative metal which is passed through a section of the electromagnetic field of the metal detecting apparatus to record a response signal as if metal has been detected. The testing apparatus comprises the test piece and a housing for the test piece which extends through said section of the electromagnetic field and acts to guide the test piece along its path, said movement of the test piece causing distortion of the electromagnetic field and actuation of the detecting mechanism to give the required signal. Metal detecting apparatus may have the testing apparatus attached thereto or moulded integrally therewith.

13 Claims, 1 Drawing Sheet

METAL DETECTING APPARATUS AND APPARATUS INCLUDING GUIDE HOUSING FOR GUIDING A METAL TEST PIECE, FOR TESTING METAL DETECTING APPARATUS

BACKGROUND OF THE INVENTION

1. Field of Invention

This invention relates to apparatus known as metal detecting apparatus and apparatus for testing metal detecting apparatus.

2. Prior Art

Metal detecting apparatus is conventionally used in the food and pharmaceutical industries, and also in other fields such as the survey of subterranean objects. A particular example is for the detection of metal which may be present, usually accidentally, in substances such as foodstuffs which may be liquid or solid and which are intended to be free of metal. The foodstuffs or other substances may be conveyed continuously, e.g. either as a stream of packages or as an unpacked but substantially continuous volume of liquid or dry material in granular form which may vary from fine powder to granules of any size convenient to the conveying means. Such substances may be carried by pipes or suitably shaped conveyor belts.

Also, metal detecting apparatus is frequently of a form in which the detecting means is based on the provision of an electromagnetic field which is arranged to surround the substance or product being conveyed. Alternatively, the electromagnetic field may be generated closely adjacent to the conveying means. Sensing means within the apparatus detects any transient distortion of the electromagnetic field which will occur if a metal object should pass through the field. In this event, a warning signal may be generated or other action may be taken as necessary or desired. However, the above detecting means are described only by way of example, and the present invention is also applicable to any other metal detecting means, e.g. apparatus in which the product is stationary.

When metal detecting apparatus is installed in its intended on line working environment, it is necessary to be able to test that it is working correctly, and preferably without stopping the flow of product. For this purpose, means are often provided for simulating the presence of unwanted metal objects. This may sometimes be done by injecting an electronic signal into the field distortion sensing system and providing means to check its subsequent response. It is also known for an operator to introduce a metal bearing probe into the electromagnetic field of the apparatus and again provide means to check the response. The disadvantage of the first method is that it does not conclusively prove that the apparatus will detect metal. Likewise, the second method is unsatisfactory since it clearly requires an operator, and its results are sensitive to positioning of the probe.

SUMMARY

According to the invention there is provided apparatus for testing metal detecting apparatus wherein a test piece of representative metal is passed through a section of the electromagnetic field of the metal detecting apparatus for recording a response signal as if metal had been detected, characterized in that the testing apparatus comprises the test piece, and a housing for the test piece which extends through said section of the electromagnetic field and acts to guide the test piece along its path, said movement of the test piece causing distortion of the electromagnetic field and actuation of the detecting mechanism to give the required signal.

Preferably the guide housing for the test piece is a tube along which the test piece can move.

The guide housing for the test piece may be formed of any suitable material, but is preferably formed of a non-magnetic material, e.g. a plastic material, a non-magnetic stainless steel, copper or aluminium.

It is also preferred that means are provided for blowing the test piece through the guide housing.

For metal detecting apparatus intended for detecting metal in moving product, the guide housing preferably extends longitudinally of the product path.

The invention also provides metal detecting apparatus including testing apparatus as defined above.

In the case of the metal detecting apparatus being used for detecting metal in moving product, the metal detecting apparatus may define an aperture containing the product path, the guide housing extending along a separate path which is distinct from the product path. Alternatively, the metal detecting apparatus may be employed adjacent the product path, the guide housing extending along a separate path which is distinct from the product path.

The guide housing may extend through, e.g. be moulded into, the encapsulation of the coil of the metal detecting apparatus.

DESCRIPTION OF THE PREFERRED EMBODIMENTS

Figure 1:
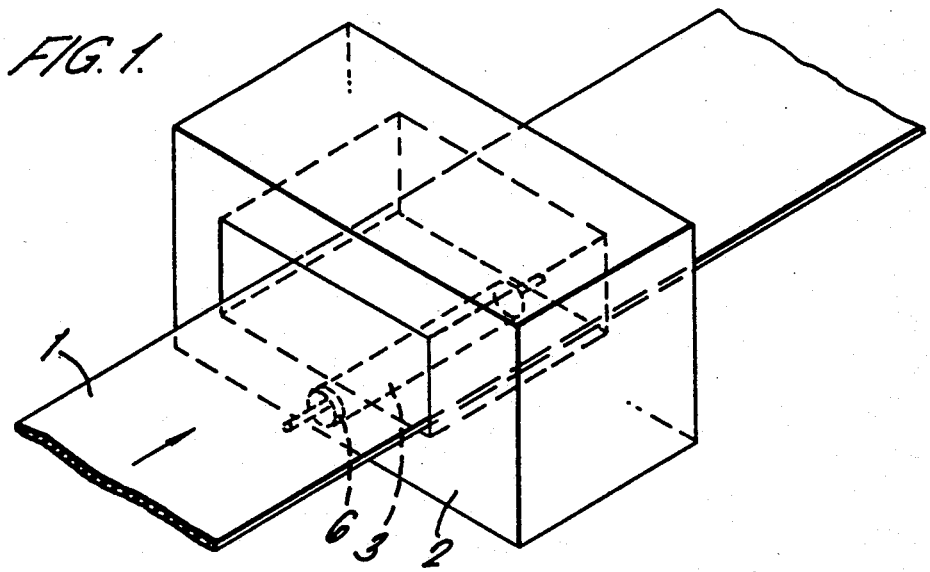
FIG. 1 is a perspective view, by way of example, of a conveyor belt passing through metal detecting having testing apparatus therefor.
Figure 2:
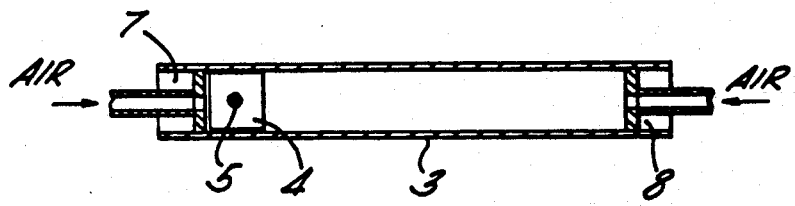
FIG. 2 is a side elevation of the apparatus of FIG. 1.
Figure 3:
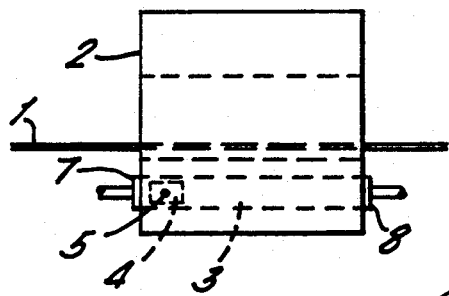
FIG. 3 is section through the testing apparatus.

Referring to FIGS. 1 to 3, metal detecting apparatus has a yoke 2 comprising a solid former having a solid wire coil wrapped around it, the whole being encapsulated in an epoxy resin and housed in a stainless steel casing. A conventional conveyor belt 1 for transporting non-metallic materials or other product (not shown) passes through the aperture defined by yoke 2. The yoke thereby provides an electromagnetic field which surrounds the materials as they pass along the conveyor 1. Any transient distortion of the electromagnetic field which will occur if metal, i.e. unwanted metal, is present among the non-metallic materials, generates a warning signal or other action of a desired manner.

The present invention is concerned with the provision of a test facility capable of testing the apparatus at intervals. For this purpose, a non-metallic guide tube 3 or other suitable guide housing made, for example, of nylon or other suitable material, and carrying internally a non-metallic slug 4 in which is embedded a test piece 5 of a representative metal, is securely fastened to the yoke 2. In this embodiment, the guide tube 3 is embedded in the encapsulation of the yoke and extends parallel to the conveyor. The guide tube thereby passes through the electromagnetic field provided by the yoke. One end of the tube, say end 6, is on one side of the yoke and the other end is on the other side of the yoke. When the slug 4 is stationary, the distortion effect is a constant which is tuned out by control means and thus a warning signal or other action is not generated. However, movement of the slug within the tube causes a distortion of the field which does generate a response.

The slug 4 can move freely along the guide tube 3 from one end to the other, and is constrained to move therealong, in this embodiment, by pulses of air introduced through tubular junctions 7, 8 mounted in respective ends of the tube. Conventional blow means (not shown) are provided to generate the air pulses. When the slug 4 moves from one end of the tube 3 to the other, it moves from one side of the yoke 2 to the other. The normal rest position of the slug 4 is at the left-hand end of the tube 3 (FIGS. 2 and 3). Upon the application of pulses of air first through junction 7 and then through junction 8, the slug will travel from left to right and then from right to left and should travel from one side of the yoke to the other side and then back again. As the slug moves it generates corresponding responses to the apparatus sensing means.

The control means for generating the pulses of air pressure through the end junctions 7, 8 include reversible valve means (not shown) which may be arranged to operate, say, every 15 or 30 minutes or whenever is most convenient to an operator so that the apparatus is checked at these intervals.

The size of the test piece 5 in the slug 4 may be varied according to the sensitivity of the testing means, and the test piece may be made of different materials depending on the nature of the contaminant anticipated in the product. In this embodiment, the test piece 5 is a sphere of stainless steel.

As illustrated, the guide tube 3 is mounted close to the bottom of the yoke, but it may be fixed in any desired position relative to the yoke. For example, if the space taken up by the product being conveyed allows, the tube 3 may extend through the aperture of the yoke. Also, the guide tube 3 is shown in a horizontal attitude, but if desired the yoke 2 and/or the guide tube 3 may be fixed in an inclined or vertical attitude relative to the yoke if this is necessary or more convenient. Movement of the slug 4 in the same direction as the materials on the conveyor belt 1 is preferred since in such a situation if the slug generates a warning signal by distorting the electromagnetic field, any unwanted metal carried by the materials on the conveyor belt should also generate a warning signal.

Whatever the preferred location of the guide tube 3, for example whether the tube extends through the aperture defined by the yoke 2 or the encapsulation of the coil, it will be appreciated that the tube extends along a path which is distinct from the path of the materials being conveyed through the yoke. The presence of the tube 3 and thus the ability of the slug 4 to test the metal detecting apparatus does not affect the passage of the materials. Moreover, the slug 4 can be blown along the tube 3 to test the metal detecting apparatus without having to stop the conveyor belt 1 and without any interference with the materials thereon.

Figure 4:
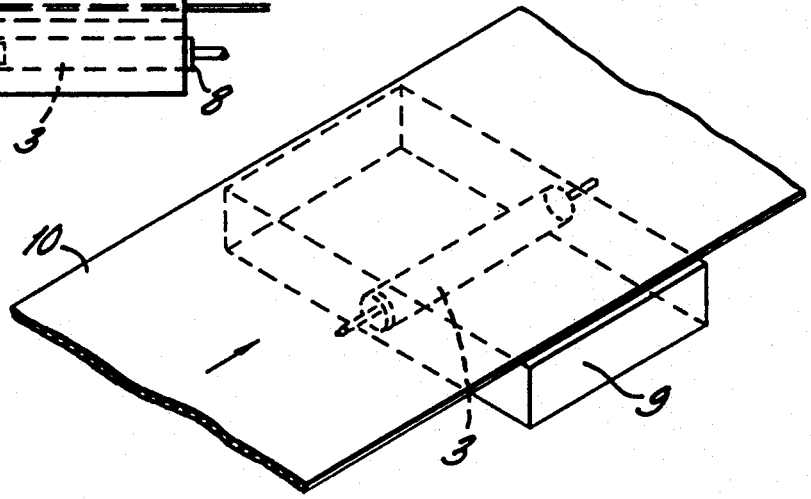
FIG. 4 shows a second embodiment of metal detecting apparatus having the same testing apparatus as in the first embodiment.

FIG. 4 shows the same guide tube 3 mounted on an alternative metal detecting apparatus in which the electromagnetic field producing coil and field distortion detecting means are built into a relatively thin rectangular solid 9. The conventional product conveyor belt 10 runs just above the detecting apparatus 9 so that an electromagnetic field adjacent to the conveyor belt appears to emanate at right angles to the belt. The guide tube 3 is again moulded into the solid 9 and extends longitudinally of the conveyor belt 10 with its ends on respective sides of the electromagnetic field. Alternatively, the guide tube 3 may be attached to the underside of the solid 9.

As before, at regular intervals the metal detecting apparatus is tested by generating air pulses through the tubular end junctions of the guide tube 3 to blow the slug 4 from one end to the other end and back again. As the slug 4 moves through the electromagnetic field, the test piece 5 distorts the field and generates corresponding responses in the apparatus sensing means.

Also, as in the previous embodiment, use of the slug containing the test piece does not interfere with the passage of the materials on the conveyor belt.

The response signal given in consequence to the movement of the slug 4 along the tube 3 indicates that the metal detecting apparatus is operative. If desired, control means may be provided whereby the response signal may also be employed to recalibrate the metal detecting apparatus as required.

It will be appreciated that the testing apparatus described above may be employed in combination with metal detecting apparatus already in use by suitable attachment of the guide tube 3 or other housing to the yoke or other member creating the electromagnetic field, instead of being moulded into the metal detecting apparatus.

In other cases in which the testing apparatus is designed as a integral part of the metal detecting apparatus, the guide housing for the slug 4 may comprise a simple aperture or passageway extending through the encapsulation of the coil rather than a preformed housing, e.g. the above described tube 3, moulded into the encapsulation or attached thereto.

We claim:

1. Testing apparatus for testing metal detecting apparatus to enable periodic testing to determine if said metal detecting apparatus having a product path down which a product passes for metal detection, is functioning comprising:

a test piece, capable of movement and formed of representative metal and capable of being passed through a section of an electromagnetic field of said metal detecting apparatus at discrete intervals for generating a response signal by said metal detecting apparatus indicating that metal has been detected, and a guide housing for receiving said test piece and extending along a separate path which is distinct from said product path and for keeping said test piece distinct from said product path, said guide housing extending through a section of said electromagnetic field so as to guide movement of said test piece along a predetermined path within said guide housing, said movement of said test piece causing distortion of said electromagnetic field of said metal detecting apparatus, generation of said response signal, and actuation of a detecting mechanism of said metal detecting apparatus to indicate that said metal test piece has been detected.

2. Testing apparatus as claimed in claim 1, wherein the guide housing for the test piece is a tube through which the test piece can move.

3. Testing apparatus as claimed in claim 1, wherein the guide housing for the test piece is formed of nonmagnetic material.

4. Testing apparatus as claimed in claim 1, including means for blowing the test piece through the guide housing.

5. Testing apparatus as claimed in claim 1, wherein said guide housing is oriented to extend longitudinally of said product path.

6. Metal detecting apparatus including an electromagnetic field producing coil, a product path down which a product passes for metal detection and testing apparatus, comprising:
   a test piece, and
   a housing for keeping said test piece distinct from said product path,
   wherein said test piece, formed of representative metal, is passed through a section of an electromagnetic field of said metal detection apparatus produced by said coil at discrete intervals, for generating a response signal by said metal detecting apparatus indicating that metal has been detected, and
   wherein said housing extends through a section of said electromagnetic field of said metal detecting apparatus and acts to guide movement of said test piece along a predetermined path within said housing,
   movement of said test piece causing distortion of said electromagnetic field of said metal detecting apparatus, generation of said response signal, and actuation of a detection mechanism of said metal detecting apparatus to indicate that said metal test piece has been detected.

7. Metal detecting apparatus as claimed in claim 6 for detecting metal in moving product, wherein the metal detecting apparatus defines an aperture containing a product path, a housing extending along a separate path which is distinct from the product path.

8. Metal detecting apparatus as claimed in claim 6 for detecting metal in moving product, wherein the metal detecting apparatus is employed adjacent the product path, the guide housing extending along a separate path which is distinct from the product path.

9. Metal detecting apparatus as claimed in claim 6, wherein the guide housing extends through an encapsulation of the coil of the metal detecting apparatus, 10. A method of testing a metal detecting apparatus having a product path down which a product passes for metal detection comprising the steps of:
    moving a test piece formed of a representative metal along a predetermined path through a housing, said housing keeping said test piece distinct from said product path and extending into an electromagnetic field of said metal detecting apparatus as discrete intervals, thereby causing distortion of said electromagnetic field to produce a response signal and actuation of a detecting mechanism of said metal detecting apparatus to give an indication that said metal test piece has been detected.

11. A method of testing a metal detecting apparatus according to claim 10 wherein movement of said test piece is guided by said housing.

12. A method of testing a metal detecting apparatus according to claim 10, further comprising the step of moving said test piece by blowing said test piece through said housing.

13. A method of testing a metal detecting apparatus according to claim 10, wherein movement of said test piece occurs while said metal detecting apparatus is operating to detecting metal in a moving product.

* * * * *